United States Patent
Zhao et al.

(10) Patent No.: US 10,349,481 B2
(45) Date of Patent: Jul. 9, 2019

(54) DALI INTERFACE CIRCUIT WITH BOOTSTRAP FUNCTION

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Pengyuan Zhao, Zhejiang (CN); Xiaobo You, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/203,140

(22) Filed: Nov. 28, 2018

(65) Prior Publication Data
US 2019/0174591 A1    Jun. 6, 2019

(51) Int. Cl.
*H05B 37/02* (2006.01)
*H05B 33/08* (2006.01)

(52) U.S. Cl.
CPC ......... *H05B 33/0842* (2013.01); *H05B 37/02* (2013.01)

(58) Field of Classification Search
CPC ............... H05B 37/02; H05B 37/0227; H05B 37/0272; H05B 33/08; H05B 33/0842; H05B 33/0845; H05B 33/0857; H05B 33/0863
See application file for complete search history.

(56) References Cited

U.S. PATENT DOCUMENTS 9,041,379 B2 * 5/2015 Lyons ................ H05B 33/0815
323/288

* cited by examiner

*Primary Examiner* — Jimmy T Vu
(74) *Attorney, Agent, or Firm* — Wang Law Firm, Inc.

(57) ABSTRACT

A DALI interface circuit with bootstrap function, the DALI interface circuit is powered by a power supply circuit, and includes a rectification module, a communication transmitting circuit electrically connected to the rectification module, and a signal input terminal electrically connected to the communication transmitting circuit, the communication transmitting circuit has a MOS transistor Q2 and a bootstrap circuit electrically connected to the MOS transistor Q2. The invention simplifies the solution, reduces components, reduces the cost, and saves space on the circuit board. The communication logic has become simpler and more stable.

10 Claims, 3 Drawing Sheets

DALI INTERFACE CIRCUIT WITH BOOTSTRAP FUNCTION

CROSS-REFERENCE TO A RELATED APPLICATION

This application claims priority to a Chinese Patent Application No. CN 201711250068.5, filed on Dec. 1, 2017.

FIELD OF THE TECHNOLOGY

The present invention relates to digital addressable lighting interface circuit, with particular emphasis on a DALI interface circuit with bootstrap function.

BACKGROUND

The lighting control system uses a combination of computer, communication and digital dimming technology to automate the lighting system according to the function, time period, indoor brightness or the use of the area. With the rapid development of the building automation and lighting industry, lighting control systems with energy-saving design and digital control as the core will be an inevitable trend in the development of the lighting market.

DALI (Digital Addressable Lighting Interface) is an internationally-recognized lighting control communication protocol with a communication speed of 1200 BPS±10%, and mainly used for dimming control of multiple fluorescent lamps and LED lighting. DALI can form a network by a maximum of 64 short addresses and 16 group addresses, and one host can control one or more slaves to communicate in half-duplex mode.

The DALI interface communication protocol has simple coding and reliable communication. Its main electrical characteristics are as follows: 1. asynchronous serial communication, information transmission rate is 1200 baud/s; 2. half-duplex, two-line differential drive, data transmission using Manchester coding mode; 3. The voltage difference of the DALI bus is used to judge the level. The voltage difference is 1 between 9.5 and 22.5V, 0 between −6.5 and 6.5V; 4. DALI bus current is less than 250 mA; 5. The rise and fall time of DALI signal is 10~100 μs.

The level of the DALI bus is different from the level of the microcontroller. In order to complete the communication between the host and the slave, an interface circuit must be provided to implement level shifting between the DALI bus and the microcontroller. The interface circuit is a difficult point in the design of the DALI system, mainly because it must meet the electrical characteristics of the DALI protocol.

The DALI interface circuit includes a host interface circuit and a slave interface circuit. The present application is directed to a slave interface circuit. In the prior art, in the communication process of the DALI bus, the DALI bus needs to be short-circuited, and pull the bus voltage down from high to low level. The N-channel MOS transistor is usually used for short-circuit operation during operation. The turn-on voltage of the N-channel MOS transistor is between 2 and 4V, but since the power supply voltage of the microcontroller is usually 3.3V, it cannot effectively ensure that the MOS transistor is turned on. Therefore, in the existing product design, the power supply part needs to design a power supply of 5V or more to supply power to the driving circuit of the MOS tube to turn on the MOS tube. However, the design of the power supply circuit causes the entire circuit to become complicated, the cost rises, and the stability is degraded.

SUMMARY OF THE INVENTION

Therefore, the present invention provides a DALI interface circuit with bootstrap function can solve the power supply problem of the MOS tube driving circuit, and can save the cost and save space on the circuit board.

A DALI interface circuit with bootstrap function, the DALI interface circuit is powered by a power supply circuit, and includes a rectification module, a communication transmitting circuit electrically connected to the rectification module, and a signal input terminal electrically connected to the communication transmitting circuit, characterized in that: the communication transmitting circuit comprises a MOS transistor Q2 and a bootstrap circuit electrically connected to the MOS transistor Q2, the bootstrap circuit includes a diode D4, a resistor R7, the resistor R10, the capacitor C11, the resistor R9, the anode of the diode D4 is electrically connected to the output end of the power supply circuit, the cathode of the diode D4 is connected to one end of the resistor R7, and the capacitor C11 is connected in series with the resistor R9 and then connected in parallel with the resistor R10, one end of the resistor R10 is connected to the other end of the resistor R7, the other end of the resistor R10 is grounded, the gate of the MOS transistor Q2 is electrically connected between the resistor R7 and the resistor R10, and the output end of the rectification module is connected to the drain of the MOS transistor Q2, the source of the MOS transistor Q2 is grounded, and the signal input terminal is electrically connected between the capacitor C11 and the resistor R9.

Advantageously, the bootstrap circuit further includes a capacitor C10, one end of the capacitor C10 is electrically connected to the gate of the MOS transistor Q2, and the other end of the capacitor C10 is grounded.

Advantageously, the DALI interface circuit further includes a communication receiving circuit electrically connected to the rectification module and a signal receiving terminal electrically connected to the communication receiving circuit, the communication receiving circuit comprising a diode D3, a resistor R5, a resistor R6, and a MOS transistor Q1, a resistor R2, a resistor R3, wherein an anode of the diode D3 is connected to an output end of the rectification module, a cathode of the diode D3 is connected to one end of the resistor R5, and the other end of the resistor R5 is connected to one end of the resistor R6 and the gate of the MOS transistor Q1, the source electrode of the MOS transistor Q1 is connected to the other end of the resistor R6 and is grounded, one end of the resistor R2 is connected to the output end of the power supply circuit, the other end of the resistor R2 is connected to one end of the resistor R3 and the drain of the MOS transistor Q1, and the other end of the resistor R3 is connected to the signal receiving terminal.

Advantageously, the DALI interface circuit further includes an MCU processor electrically connected to the communication receiving circuit and the communication transmitting circuit, the MCU processor controls the MOS transistor Q2 to be turned on or off, and processes the square wave differential signal of the DALI bus, and outputs the processed DALI digital signal.

Advantageously, the power supply circuit is respectively electrically connected to the rectification module and the MCU processor, and the power supply circuit converts an input voltage into an output voltage, which is then used to supply power to the MCU processor.

Advantageously, the MCU processor is an MSP430FR2032 model.

Advantageously, the power supply circuit includes a voltage shaping circuit and a voltage conversion circuit, one end of the voltage shaping circuit is connected to an output end of the rectification module, and the other end of the voltage shaping circuit is connected to one end of the voltage conversion circuit, the other end of the voltage conversion circuit is connected to the MCU processor.

Advantageously, the voltage shaping circuit includes a capacitor D1, a varistor FV1, a capacitor C2, and a capacitor C3. The capacitor C2 is connected in parallel with the capacitor C3, and the power supply terminal of 9-18V and the anode of the diode D1 and one end of the varistor FV1 is connected, and the cathode of the diode D1 is connected to one end of the capacitor C2, the voltage conversion circuit 12 includes a power supply chip, a capacitor C1, a diode D2, an inductor L1, a resistor R1, a resistor R4, a capacitor C4, a capacitor C5, and a capacitor C6, wherein one end of the capacitor C3 is connected to the 4 pin and the 5 pin of the power supply chip, the other end of the capacitor C3 is connected to the 2 pin of the power supply chip and grounded, and the 1 pin of the power supply chip is connected to the 6 pin of the power supply chip, the cathode of diode D2 and the end of inductor L1 through capacitor C1, the anode of the diode D2 is grounded, the capacitor C4, the capacitor C5, and the capacitor C6 are connected in parallel, the other end of the inductor L1 is connected to one end of the resistor R1 and the capacitor C4 and is connected to the supply voltage VDD, and the other end of the resistor R1 is connected to one end of the resistor R4 and the 3-pin of the power supply chip, and the capacitor C4 is connected to the other end of the resistor R4 and grounded.

Advantageously, the power supply circuit includes a varistor FV2, a resistor R8, a transistor Q4, and a voltage regulator block N2, a resistor R11, a resistor R12, a capacitor C7, wherein the power supply terminal of 9-18V is connected to the collector of transistor Q4 and one end of resistor R8 and varistor FV2, the other end of resistor R8 and the base of transistor Q4 and the cathode of the voltage regulator block N2 is connected, the emitter of the transistor Q4 is connected to one end of the resistor R11 and the capacitor C7 and connected to VDD, the anode of the voltage regulator block N2 is connected to one end of the resistor R12 and the other end of the capacitor C7 and the varistor FV2, and is grounded, the other end of the resistor R11 is connected to the other end of the resistor R12 and the reference terminal of the voltage regulator block N2.

Advantageously, the DALI interface circuit further includes a signal input circuit, the signal input circuit is connected to the MCU processor, and the signal input circuit comprises a button signal input circuit, an RF signal input circuit, an infrared remote control signal input circuit or one or more type of wired signal input circuit.

Compared with the prior art, the invention effectively solves the problem of low voltage circuit cannot effectively guarantee the MOS transistor drive circuit. In traditional circuits, if the reliability of MOS transistor driver is to be guaranteed, in addition to the low voltage MCU power supply circuit itself, there must be a high voltage MOS driver voltage power supply circuit. The circuit design of MOS driven by high voltage will lead to complicated circuit and higher overall power consumption. This design simplifies the scheme, reduces the components, reduces the cost and saves the space on the circuit board, and becomes simpler and more stable for the communication logic.

DETAILED DESCRIPTION OF THE DRAWINGS

The drawings described herein are intended to promote a further understanding of the present invention, as follows.

Among them, 1—rectification module, 2—communication receiving circuit, 3—communication transmitting circuit, 4—MCU processor, 5, 5'—power supply circuit, 6—button signal input circuit, 7—RF signal input circuit, 8—infrared remote control signal input circuit, 9—wire signal input circuit, 10—bootstrap circuit, 11—voltage shaping circuit, 12—voltage conversion circuit.

DESCRIPTION OF THE PREFERRED EMBODIMENTS

The present application is illustrated by way of the following detailed description based on of the accompanying drawings. It should be noted that illustration to the embodiment in this application is not intended to limit the invention.

Figure 1:
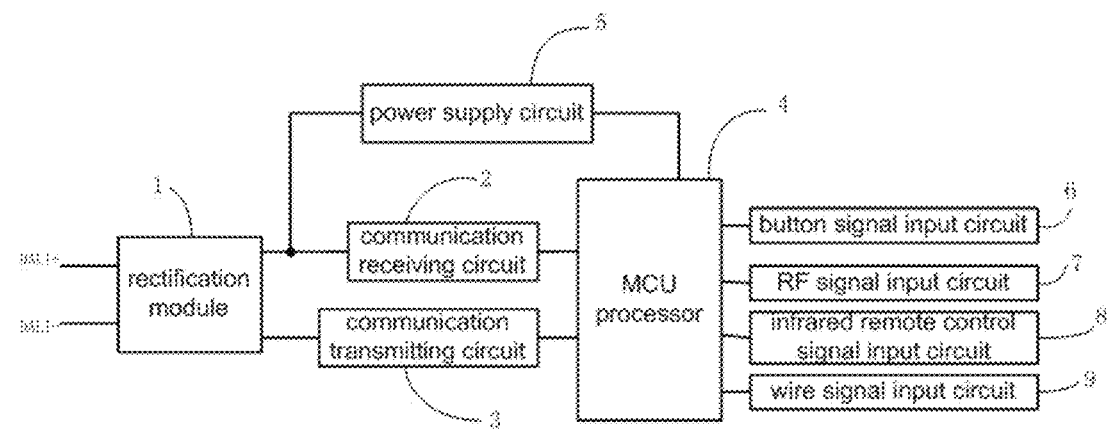
FIG. 1 is a schematic diagram showing the structure of a DALI interface circuit of the present invention.
Figure 2:
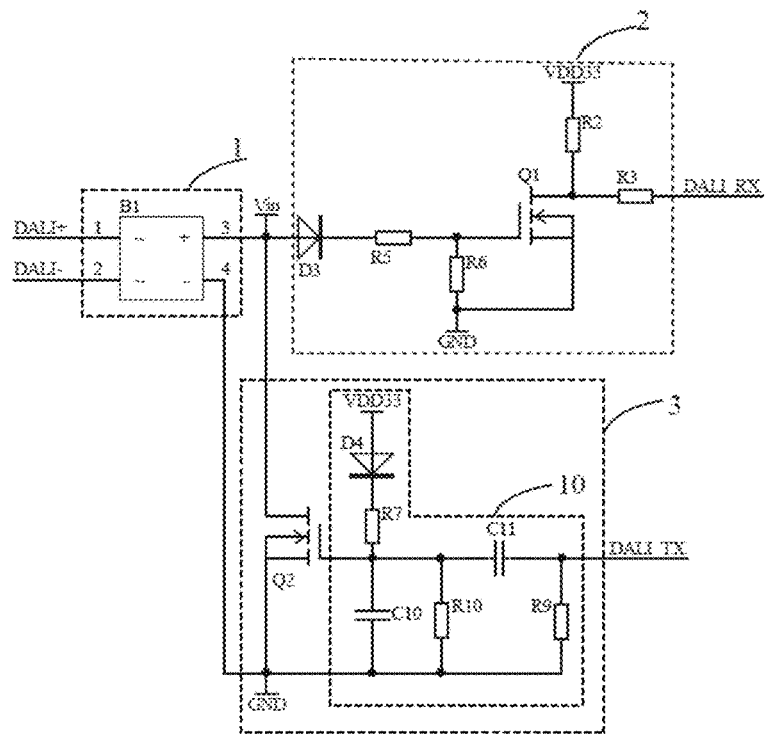
FIG. 2 is a schematic diagram of a DALI interface circuit of the present invention.

Please refer to FIG. 1 and FIG. 2, which are respectively a schematic diagram and a circuit diagram of a DALI interface circuit structure of the present invention. The DALI interface circuit with a bootstrap function of the present invention has a power supply circuit (5, 5')Powering, and comprising a rectification module 1, a communication transmitting circuit 3 electrically connected to the rectification module 1, and a signal input terminal electrically connected to the communication transmitting circuit 3, the communication transmitting circuit 3 comprising a MOS transistor Q2 and a bootstrap circuit 10 electrically connected to the MOS transistor Q2, the bootstrap circuit 10 includes a diode D4, a resistor R7, a resistor R10, a capacitor C11, a resistor R9, an anode of the diode D4 is electrically connected to the output end of the power supply circuit (5, 5'), the cathode of the diode D4 is connected to one end of the resistor R7, the capacitor C11 is connected in series with the resistor R9 and then connected in parallel with the resistor R10, and one end of the resistor R10 is connected to the other end of the resistor R7, the other end of the resistor R10 is grounded, the gate of the MOS transistor Q2 is electrically connected between the resistor R7 and the resistor R10, and the output end of the rectifier module is connected to the drain of the MOS transistor Q2, the source of the MOS Q2 is grounded, the signal input terminal is electrically connected between the capacitor C11 and the resistor R9.

The bootstrap circuit 10 of the present invention further includes a capacitor C10, one end of the capacitor C10 is electrically connected to the gate of the MOS transistor Q2, and the other end of the capacitor C10 is grounded.

The application ensures that the voltage is 2.0V when DALI_TX output low level of 0V by adjusting the resistance values of the resistor R7 and the resistor R10 and the MOS transistor Q2 is cut-off, then the voltage difference between the two ends of capacitor C11 is 2.0V. When the TX signal port starts to transmit data, the TX signal port will change to a high level of 3.3v, because the voltage difference between the two ends of the capacitor C11 cannot be changed instantaneously, so the base voltage of the MOS transistor Q2 becomes 5.3V (5.3V=2V+3.3V) to ensure that MOS transistor Q2 is turned on.

Referring to FIG. 2 again, the DALI interface circuit of the present invention further includes a communication receiving circuit 2 electrically connected to the rectification module 1 and a signal receiving terminal electrically connected to the communication receiving circuit 2, the communication receiving circuit 2 includes a diode D3, a resistor R5, a resistor R6, a MOS transistor Q1, a resistor R2, and a resistor R3. The anode of the diode D3 is connected to the output end of the rectification module 1, and the cathode of the diode D3 is connected to one end of the resistor R5. The other end of the resistor R5 is connected to one end of the resistor R6 and the gate of the MOS transistor Q1. The source of the MOS transistor Q1 is connected to the other end of the resistor R6 and grounded. One end of the resistor R2 is connected to the output end of the power supply circuit, and the other end of the resistor R2 is connected to one end of the resistor R3 and the drain of the MOS transistor Q1, and the other end of the resistor R3 is connected to the signal receiving terminal.

The DALI interface circuit of the present invention further includes an MCU processor 4 electrically connected to the communication receiving circuit 2 and the communication transmitting circuit 3, the MCU processor 4 controls the conduction or cutoff of MOS transistor Q2. The square wave differential signal of the DALI bus is processed and the processed DALI digital signal is output. The communication receiving circuit 2 of the DALI interface circuit converts the high voltage and the low voltage on the DALI bus into high and low level signals that can be recognized by the MCU processor 4, and the communication transmitting circuit 3 of the DALI interface circuit is configure to convert the high and low levels of the 10 pin of the MCU processor 4 to high and low voltages to affect the level change on the DALI bus to achieve signal transmission to the DALI bus.

The working principle of the DALI interface circuit of the present invention will be described below with reference to FIG. 2:

When the MCU processor does not send a signal, the TX signal port remains at a low level. At this time, the G-pole level of the MOS transistor Q2 is determined by VDD and the diode D4, the resistor R7 and the resistor R10. Ensure that the G-pole level of Q2 is between 1.7V and 2.0V by adjusting the resistance value of the resistor R7 and R10, so that the MOS transistor Q2 is turned off, the DALI bus is at 9.5~22.5V high level, and the high-level signal is defined as 1. At this time, the voltage difference between the two ends of the capacitor C11 is 1.7V~2.0V. When starting to send a square wave digital signal to the DALI bus, the TX signal IO port instantaneously becomes a high level 3.3V. Since the voltage at both ends of the capacitor cannot change instantaneously, the G-pole voltage of the MOS transistor Q2 is instantaneously raise to about 5V by the capacitor C11, that is, the 3.3V connected to the TX signal is superimposed on the original 1.7V~2.0V. At this time, the rectifier diode D4 is turned off, and the G-pole voltage of the MOS transistor Q2 is maintained, thus making the MOS tube Q2 conductive. the 250 mA current output from the external constant current source on the DALI bus is completely discharged through the MOS transistor Q2, the DALI bus voltage is pulled down to a low level signal of −6.5V~6.5V, and the low level signal is defined as 0. When the TX signal IO port is changed to the low level 0V, the capacitor C11 will pull back the G pole voltage of Q2 back to 1.7~2.0V voltage, and the diode D4 is turned on, and the resistor R7 and the resistor R10 together ensure the G pole voltage is maintained at 1.7~2.0V, Q2 is cut off, and the DALI bus changes back to a high level of 9.5~22.5V, thus realizing the transmission of binary digital signals.

In the design process of the present invention, it should be noted that the value of the capacitor C11 is much larger than the parasitic capacitance of the capacitor C10 and the G pole of the MOS transistor, and the capacitor C11 can instantly raise the voltage of the G pole of the MOS transistor.

Adjust the resistance value of resistor R7 and resistor R10 to ensure that the voltage must be between 1.7V and 2.0V. If it is too large, there is a risk of continuous conduction of Q2. If it is too small, the TX of the MCU processor is high level, and then there is no guarantee for the conduction of Q2. Adjust the ratio of the resistor R7 and the resistor R10 to the capacitor C11 ensures that when the TX is at the high level, the resistor R7 and the resistor R10 cannot discharge too fast, otherwise the G pole voltage of the MOS transistor Q2 will fall too fast, causing that it will be turned off during the process of the signal receiving terminal of the TX is maintaining the high level, and the signal transmission fails.

When the DALI bus has a square wave signal coming to receive, if the square wave is high level on the bus, and then after 9.5~22.5V passes through the rectifier diode D3, the resistor R5 and the resistor R6 through partial pressure, the G-pole voltage of the MOS transistor Q1 of the communication receiving circuit is greater than 4V, the RX signal receiving terminal of the MCU processor N4 is low level; If the square wave is low level on the bus, and then after −6.5v~6.5v passes through the rectifier diode D3, the resistor R5, and the resistor R6 through partial pressure, the G-pole voltage of the MOS transistor Q2 is less than 2V, the MOS transistor Q1 is turned off, and the RX signal receiving terminal of the MCU processor N4 is at a high level. In this way, the square wave digital differential signal of the DALI bus is converted into a digital signal that the MCU processor can parse.

The power supply circuit (5, 5') of the present invention is electrically connected to the rectification module 1 and the MCU processor 4, respectively, and the power supply circuit (5, 5') converts an input voltage into an output voltage, and after conversion the output voltage supplies power to the MCU processor 4.

Figure 3:
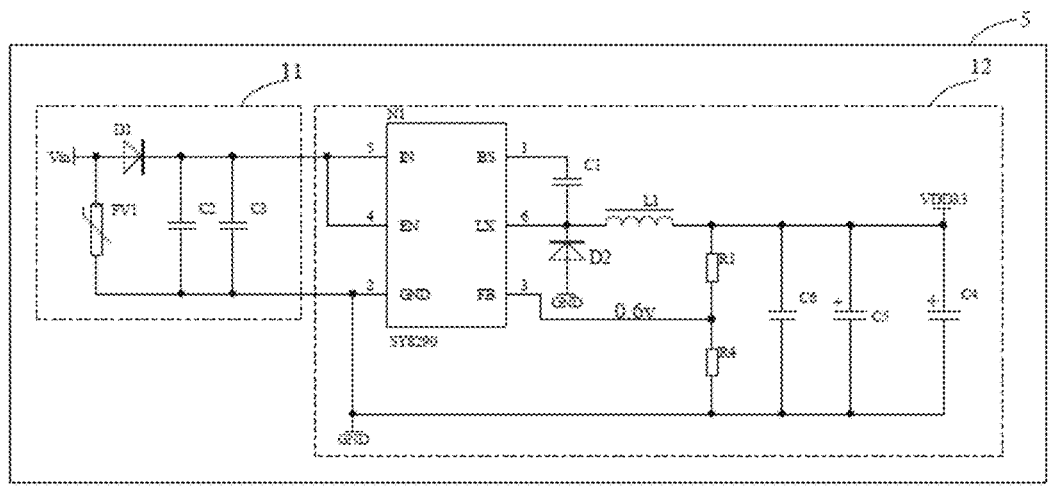
FIG. 3 is a schematic diagram of an embodiment of a power supply circuit of the present invention.

The present invention uses two different power supply circuits referring to FIG. 3, which is a schematic diagram of an embodiment of a power supply circuit according to the present invention, a power supply circuit 5 includes a voltage shaping circuit 11 and a voltage conversion circuit 12, and one end of the voltage shaping circuit 11 is connected to the output end of the rectification module 1, and the other end of the voltage shaping circuit 11 is connected to one end of the voltage conversion circuit 12, and the other end of the voltage conversion circuit 12 is connected to the MCU processor 4.

In the first power supply circuit, the voltage shaping circuit 11 includes a capacitor D1, a varistor FV1, a capacitor C2, and a capacitor C3. The capacitor C2 is connected in parallel with the capacitor C3, and the power supply terminal of 9-18V and the anode of the diode D1 and one end of the varistor FV1 is connected, and the cathode of the diode D1 is connected to one end of the capacitor C2. The voltage conversion circuit 12 includes a power supply chip, a capacitor C1, a diode D2, an inductor L1, a resistor R1, a resistor R4, a capacitor C4, a capacitor C5, and a capacitor C6, wherein one end of the capacitor C3 is connected to the 4 pin and the 5 pin of the power supply chip, the other end of the capacitor C3 is connected to the 2 pin of the power supply chip and grounded, and the 1 pin of the power supply chip is connected to the 6 pin of the power supply chip, the cathode of diode D2 and the end of inductor L1 through capacitor C1, the anode of the diode D2 is grounded, the capacitor C4, the capacitor C5, and the capacitor C6 are connected in parallel. The other end of the inductor L1 is connected to one end of the resistor R1 and the capacitor C4 and is connected to the supply voltage VDD, and the other end of the resistor R1 is connected to one end of the resistor R4 and the 3-pin of the power supply chip, and the capacitor C4 is connected to the other end of the resistor R4 and grounded.

Specifically, in the present invention, the power supply chip of the voltage conversion circuit uses SY8290, and the power supply chip of this model is prior art. This application can also use other chips that meet the requirements, without any restrictions.

Figure 4:
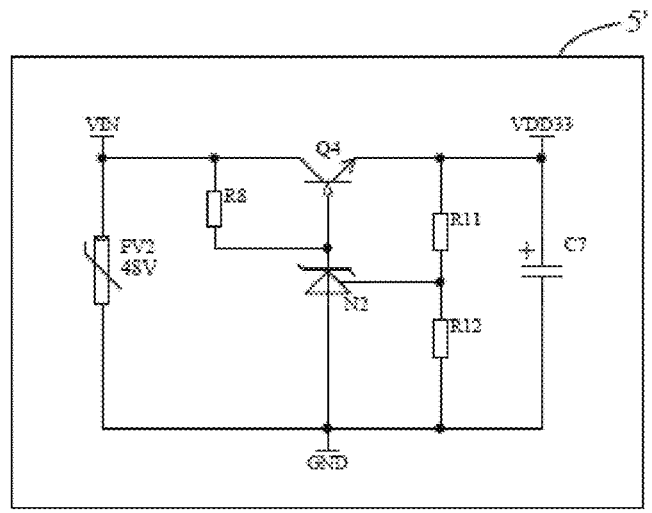
FIG. 4 is a schematic view of another embodiment of a power supply circuit of the present invention.

FIG. 4 is a schematic diagram of another embodiment of the power supply circuit of the present invention. As shown in FIG. 4, in the second power supply circuit, the power supply circuit 5' includes a varistor FV2, a resistor R8, a transistor Q4, and a voltage regulator block N2, a resistor R11, a resistor R12, a capacitor C7, wherein the power supply terminal of 9.5-22.5V is connected to the collector of transistor Q4 and one end of resistor R8 and varistor FV2, the other end of resistor R8 and the base of transistor Q4 and the cathode of the voltage regulator block N2 is connected. The emitter of the transistor Q4 is connected to one end of the resistor R11 and the capacitor C7 and connected to VDD. The anode of the voltage regulator block N2 is connected to one end of the resistor R12 and the other end of the capacitor C7 and the varistor FV2, and is grounded. The other end of the resistor R11 is connected to the other end of the resistor R12 and the reference terminal of the voltage regulator block N2. Other buck circuits can also be selected for this application, and are not limited to the above-mentioned buck circuit.

Figure 5:
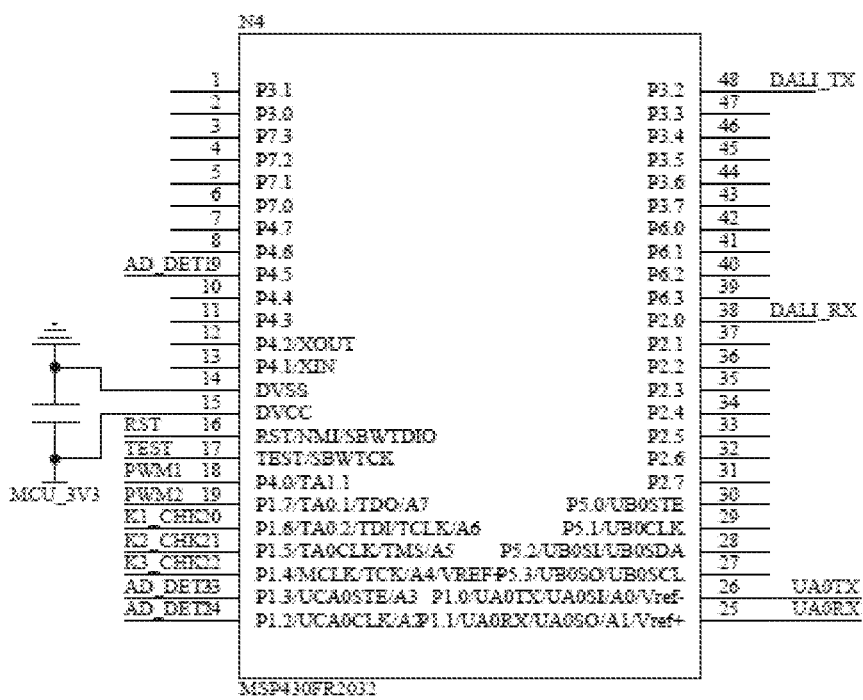
FIG. 5 is a schematic diagram of an interface of an MCU processor of the present invention.

In the present application, the MCU processor 4 is an MSP430FR2032 model, and FIG. 5 is a schematic diagram of an interface of the MCU processor 4 of the present invention. It should be noted that this application can also select other types of single-chip microcomputers, and as long as has a data transmission interface, which can realize DALI data conversion operation.

In a specific implementation process, the application further includes a signal input circuit, and the signal input circuit is connected to the MCU processor 4. The signal input circuit includes a button signal input circuit 6, an RF signal input circuit 7, and an infrared remote control signal input circuit or one or more of wired signal input circuit 9. The button signal input circuit 6 is responsible for human-computer interaction, and the user issues commands through the buttons, thereby controlling all illuminations, including brightness increase and decrease, power switch, state switching, reset, and the like. The infrared remote control signal input circuit detects whether someone passes through the lighting area and further gives instructions. When it is detected that someone passes through the lighting area, it controls the lighting of the lighting fixture, and simultaneously sends a signal to the control terminal to intelligently turn the lighting fixture on or off. The user can also select the RF signal input and wired signal input. Further, the user can instruct the MCU processor 4 what to do and what instructions to send in a variety of ways to achieve the desired control effect of the illumination, and realize the functions of brightness, group, scene, broadcast, and automatic addressing of the light. The invention is based on the control circuit of the DAILI communication bus, and is realized by user configurable instructions, and has great flexibility and expandability.

The invention is based on the control circuit of the DALI communication bus, and is realized by user configurable instructions, and has great flexibility and expandability. Therefore, the present invention effectively solves the power supply problem of the MOS transistor driving circuit, reduces a 5V power supply circuit, thereby saving cost, saving space on the circuit board, and reducing a triode, and the communication logic becomes more simple and more stable, and guarantee the stability of signal transmission of DALI interface circuit.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

The invention claimed is:

1. A DALI interface circuit with bootstrap function, the DALI interface circuit is powered by a power supply circuit, and includes a rectification module, a communication transmitting circuit electrically connected to the rectification module, and a signal input terminal electrically connected to the communication transmitting circuit, characterized in that: the communication transmitting circuit comprises a MOS transistor Q2 and a bootstrap circuit electrically connected to the MOS transistor Q2, the bootstrap circuit includes a diode D4, a resistor R7, the resistor R10, the capacitor C11, the resistor R9, the anode of the diode D4 is electrically connected to the output end of the power supply circuit, the cathode of the diode D4 is connected to one end of the resistor R7, and the capacitor C11 is connected in series with the resistor R9 and then connected in parallel with the resistor R10, one end of the resistor R10 is connected to the other end of the resistor R7, the other end of the resistor R10 is grounded, the gate of the MOS transistor Q2 is electrically connected between the resistor R7 and the resistor R10, and the output end of the rectification module is connected to the drain of the MOS transistor Q2, the source of the MOS transistor Q2 is grounded, and the signal input terminal is electrically connected between the capacitor C11 and the resistor R9.

2. The DALI interface circuit with bootstrap function as claimed in claim 1, wherein the bootstrap circuit further includes a capacitor C10, one end of the capacitor C10 is electrically connected to the gate of the MOS transistor Q2, and the other end of the capacitor C10 is grounded.

3. The DALI interface circuit with bootstrap function as claimed in claim 1, wherein the DALI interface circuit further includes a communication receiving circuit electrically connected to the rectification module and a signal receiving terminal electrically connected to the communication receiving circuit, the communication receiving circuit comprising a diode D3, a resistor R5, a resistor R6, and a MOS transistor Q1, a resistor R2, a resistor R3, wherein an anode of the diode D3 is connected to an output end of the rectification module, a cathode of the diode D3 is connected to one end of the resistor R5, and the other end of the resistor R5 is connected to one end of the resistor R6 and the gate of the MOS transistor Q1, the source electrode of the MOS transistor Q1 is connected to the other end of the resistor R6 and is grounded, one end of the resistor R2 is connected to the output end of the power supply circuit, the other end of the resistor R2 is connected to one end of the resistor R3 and the drain of the MOS transistor Q1, and the other end of the resistor R3 is connected to the signal receiving terminal.

4. The DALI interface circuit with bootstrap function as claimed in claim 1, wherein the DALI interface circuit further includes an MCU processor electrically connected to the communication receiving circuit and the communication transmitting circuit, the MCU processor controls the MOS transistor Q2 to be turned on or off, and processes the square wave differential signal of the DALI bus, and outputs the processed DALI digital signal.

5. The DALI interface circuit with bootstrap function as claimed in claim 4, wherein the power supply circuit is respectively electrically connected to the rectification module and the MCU processor, and the power supply circuit converts an input voltage into an output voltage, which is then used to supply power to the MCU processor.

6. The DALI interface circuit with bootstrap function as claimed in claim 5, wherein the MCU processor is an MSP430FR2032 model.

7. The DALI interface circuit with bootstrap function as claimed in claim 5, wherein the power supply circuit includes a voltage shaping circuit and a voltage conversion circuit, one end of the voltage shaping circuit is connected to an output end of the rectification module, and the other end of the voltage shaping circuit is connected to one end of the voltage conversion circuit, the other end of the voltage conversion circuit is connected to the MCU processor.

8. The DALI interface circuit with bootstrap function as claimed in claim 7, wherein the voltage shaping circuit 11 includes a capacitor D1, a varistor FV1, a capacitor C2, and a capacitor C3, the capacitor C2 is connected in parallel with the capacitor C3, and the power supply terminal of 9-18V and the anode of the diode D1 and one end of the varistor FV1 is connected, and the cathode of the diode D1 is connected to one end of the capacitor C2, the voltage conversion circuit includes a power supply chip, a capacitor C1, a diode D2, an inductor L1, a resistor R1, a resistor R4, a capacitor C4, a capacitor C5, and a capacitor C6, wherein one end of the capacitor C3 is connected to the 4 pin and the 5 pin of the power supply chip, the other end of the capacitor C3 is connected to the 2 pin of the power supply chip and grounded, and the 1 pin of the power supply chip is connected to the 6 pin of the power supply chip, the cathode of diode D2 and the end of inductor L1 through capacitor C1, the anode of the diode D2 is grounded, the capacitor C4, the capacitor C5, and the capacitor C6 are connected in parallel, the other end of the inductor L1 is connected to one end of the resistor R1 and the capacitor C4 and is connected to the supply voltage VDD, and the other end of the resistor R1 is connected to one end of the resistor R4 and the 3-pin of the power supply chip, and the capacitor C4 is connected to the other end of the resistor R4 and grounded.

9. The DALI interface circuit with bootstrap function as claimed in claim 5, wherein the power supply circuit includes a varistor FV2, a resistor R8, a transistor Q4, and a voltage regulator block N2, a resistor R11, a resistor R12, a capacitor C7, wherein the power supply terminal of 9.5-22.5V is connected to the collector of transistor Q4 and one end of resistor R8 and varistor FV2, the other end of resistor R8 and the base of transistor Q4 and the cathode of the voltage regulator block N2 is connected, the emitter of the transistor Q4 is connected to one end of the resistor R11 and the capacitor C7 and connected to VDD, the anode of the voltage regulator block N2 is connected to one end of the resistor R12 and the other end of the capacitor C7 and the varistor FV2, and is grounded, the other end of the resistor R11 is connected to the other end of the resistor R12 and the reference terminal of the voltage regulator block N2.

10. The DALI interface circuit with bootstrap function as claimed in claim 1, wherein the DALI interface circuit further includes a signal input circuit, the signal input circuit is connected to the MCU processor, and the signal input circuit comprises a button signal input circuit, an RF signal input circuit, an infrared remote control signal input circuit or one or more type of wired signal input circuit.

\* \* \* \* \*